United States Patent
Chang et al.

(10) Patent No.: US 11,227,138 B2
(45) Date of Patent: Jan. 18, 2022

(54) LIQUID CRYSTAL DISPLAY DEVICE HAVING FINGERPRINT SENSOR

(71) Applicant: HON HAI PRECISION INDUSTRY CO., LTD., New Taipei (TW)

(72) Inventors: Wei-Chih Chang, New Taipei (TW); Kuo-Sheng Lee, New Taipei (TW); I-Min Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 64 days.

(21) Appl. No.: 16/699,936

(22) Filed: Dec. 2, 2019

(65) Prior Publication Data
US 2020/0184181 A1    Jun. 11, 2020

Related U.S. Application Data

(60) Provisional application No. 62/776,477, filed on Dec. 7, 2018.

(51) Int. Cl.
*G06K 9/00* (2006.01)
*G02F 1/1333* (2006.01)
*G02F 1/1335* (2006.01)
*G02F 1/1368* (2006.01)

(52) U.S. Cl.
CPC ......... *G06K 9/0004* (2013.01); *G02F 1/1368* (2013.01); *G02F 1/13338* (2013.01); *G02F 1/133512* (2013.01); *G02F 1/133514* (2013.01); *G06K 9/00013* (2013.01)

(58) Field of Classification Search
CPC ............. G06K 9/0004; G06K 9/00013; G06K 9/0002; G02F 1/13338; G02F 1/133512; G02F 1/133514; G02F 1/1368; G02F 1/133331; G02F 1/133603
See application file for complete search history.

(56) References Cited

U.S. PATENT DOCUMENTS

| | | | |
|---|---|---|---|
| 2002/0163601 A1* | 11/2002 | Min | G02F 1/13338 349/33 |
| 2013/0176283 A1* | 7/2013 | Nakata | G06F 3/03545 345/175 |
| 2016/0224816 A1* | 8/2016 | Smith | G06K 9/0004 |
| 2018/0005005 A1* | 1/2018 | He | G06K 9/0004 |
| 2018/0151641 A1 | 5/2018 | Choo et al. | |
| 2018/0314096 A1 | 11/2018 | Yang et al. | |

(Continued)

FOREIGN PATENT DOCUMENTS

| | | |
|---|---|---|
| TW | 201830281 A | 8/2018 |
| TW | 201839656 A | 11/2018 |

*Primary Examiner* — Abhishek Sarma
(74) *Attorney, Agent, or Firm* — ScienBiziP, P.C.

(57) ABSTRACT

A LCD device defining a display area includes a color filter substrate, a thin film transistor (TFT) substrate facing the color filter substrate, a backlight module on a side of the TFT substrate away from the color filter substrate, a transparent cover on a side of the color filter substrate away from the TFT substrate, and a fingerprint sensor in the display area. The fingerprint sensor defines a fingerprint sensing area in the display area. The LCD device further includes a light emitting diode on a side of the transparent cover adjacent to the color filter substrate. The light emitting diode is configured to emit light toward the fingerprint sensing area of the transparent cover.

11 Claims, 8 Drawing Sheets

(56) References Cited

U.S. PATENT DOCUMENTS

2019/0004354 A1* 1/2019 Hsiao ................ G06K 9/00053
2019/0147213 A1* 5/2019 Yeke Yazdandoost .....................
                                                    G06K 9/00013
                                                         382/124
2020/0184183 A1* 6/2020 Chang ................... G02F 1/1368

* cited by examiner

LIQUID CRYSTAL DISPLAY DEVICE HAVING FINGERPRINT SENSOR

FIELD

The subject matter herein generally relates to a liquid crystal display (LCD) device, particularly relates to an LCD device having a fingerprint sensor.

BACKGROUND

A conventional full-screen display device, such as a mobile phone, is usually equipped with an in-screen fingerprint sensor. The fingerprint sensor defines a fingerprint sensing area in the display screen of the display device. Light from the backlight module is reflected by a finger when the finger is placed on the display screen of the display device, and then received by the fingerprint sensor. A brightness of the display screen is generally about 400~500 nits. After reflection by the skin of the finger, light passing through the polarizer to reach the fingerprint sensing area is only about 1%. The lower brightness makes it difficult to obtain a clear fingerprint, which affects a speed and correctness of fingerprint recognition.

BRIEF DESCRIPTION OF THE DRAWINGS

Implementations of the present technology will now be described, by way of embodiments only, with reference to the attached figures.

DETAILED DESCRIPTION

Figure 1:
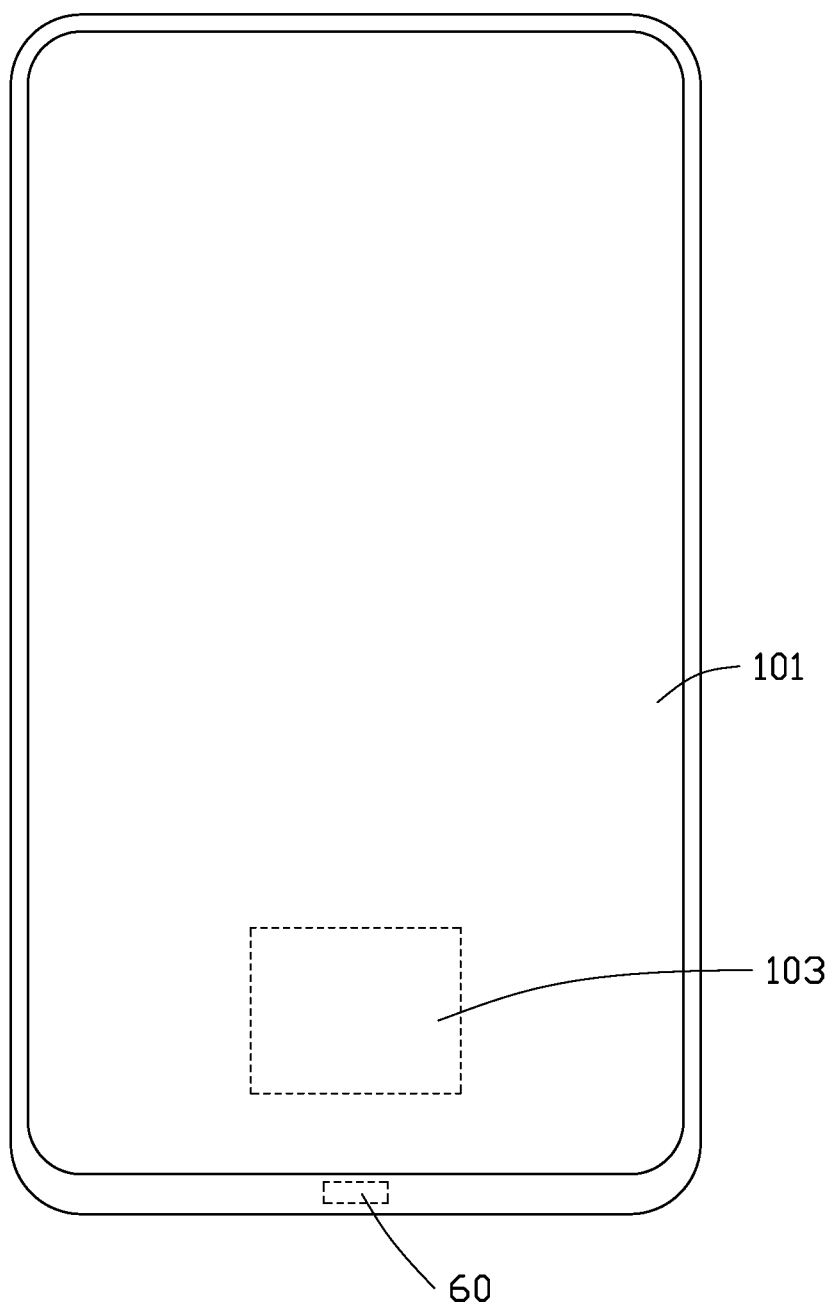
FIG. 1 is a bottom view of an LCD device in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

First Embodiment

FIG. 1 illustrates an LCD device 100 according to an embodiment. The LCD device 100 defines a display area 101. A fingerprint sensing area 103 is defined in the display area 101, shown as a rectangular region surrounded by dotted lines in FIG. 1. In this embodiment, the LCD device 100 is a mobile phone.

Figure 2:
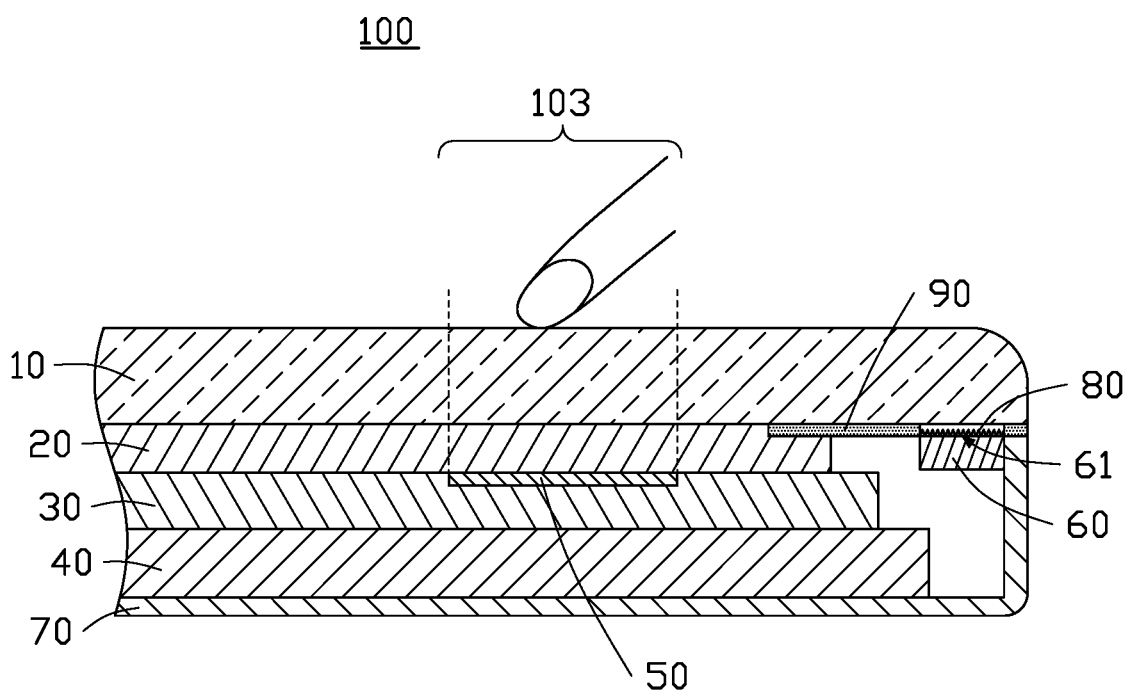
FIG. 2 is a cross-sectional view of the LCD device in accordance with the first embodiment.

As shown in FIG. 2, the LCD device 100 includes a transparent cover 10, a color filter substrate 20, a liquid crystal layer (not shown), a thin film transistor (TFT) substrate 30, and a backlight module 40 stacked in that order. The TFT substrate 30 includes a transparent substrate (not shown) and a TFT layer (not shown) on the transparent substrate. The LCD device 100 further includes a fingerprint sensor 50, the fingerprint sensor 50 defines the fingerprint sensing area 103 in the display area 101. The fingerprint sensing area 103 is aligned with the fingerprint sensor 50 along the normal direction of the LCD device 100. The fingerprint sensor 50 is configured for fingerprint recognition. In this embodiment, as shown in FIG. 2, the fingerprint sensor 50 is positioned on the TFT substrate 30, and is particularly positioned on a side of the TFT substrate 30 adjacent to the color filter substrate 20. As shown in FIG. 2, the LCD device 100 further includes a back plate 70 that carries the backlight module 40.

As shown in FIG. 1, the LCD device 100 further includes a light emitting diode (LED) 60 outside the display area 101. In this embodiment, the LED 60 is positioned adjacent to a lower edge of the LCD device 100. The fingerprint sensing area 103 is positioned in the display area 101 relatively close to the lower edge of the LCD device 100, and the fingerprint sensing area 103 is spaced apart from the LED 60.

As shown in FIG. 2, the fingerprint sensing area 103 and the LED 60 are misaligned along the normal direction of the LCD device 100 ("normal direction" of the LCD device is the thickness direction). A projection of the fingerprint sensor 50 on the backlight module 40 along the normal direction of the LCD device 100 is staggered from a projection of the LED 60 on the backlight module 40 along the normal direction of the LCD device 100. In this embodiment, the LED 60 is positioned on a side of the transparent cover 10 adjacent to the backlight module 40. In this embodiment, an area size of the transparent cover 10 is greater than an area size of the color filter substrate 20; the color filter substrate 20 partially covers the transparent cover 10, and the LED 60 is positioned in a region of the transparent cover 10 that is not covered by the color filter substrate 20.

In this embodiment, the LED 60 is located below the transparent cover 10, and the LED 60 has a light-emitting surface 61 that is perpendicular to a thickness direction (a normal direction) of the LCD device 100. In this case, when a finger of a user touches the transparent cover 10 and is in the fingerprint sensing area 103, most of the light of the LED 60 will perpendicularly enter into the transparent cover 10 and very little light of the LED 60 would reach the fingerprint sensing area 103 and be reflected by the finger. In order to direct most of the light from the LED 60 onto the fingerprint sensing area 103 on the transparent cover 10, a light adjusting component 80 is positioned between the LED 60 and the transparent cover 10.

The light adjusting component 80 is configured to change a propagation path of the light emitted from the LED 60, so that most of the light from the LED 60 can reach the fingerprint sensing area 103 on the transparent cover 10. The light adjusting component 80 can be various conventional elements capable of changing a propagation path of light, such as microprisms, microlenses, polymer mirrors, holographic mirrors, etc. A light-shielding material layer 90 is further provided on a surface of the transparent cover 10 adjacent to the LED 60 and surrounds the light-emitting surface 61 of the LED 60. The light-shielding material layer 90 may be made of, but is not limited to, a light-shielding ink (such as black ink, white ink) or an opaque material such as metal.

By using the LED 60 and the light adjusting component 80, the light from the LED 60 is emitted mostly towards the fingerprint sensing area 103 at the transparent cover 10, for strong reflection by a finger on the fingerprint sensing area 103. Thus, a light intensity of the reflected light is improved, thereby improving a speed and correctness of fingerprint recognition.

The LED 60 can be an LED emitting infrared light, for example, the infrared light has a wavelength in a range from 700 nm to 1500 nm. The LED 60 can also be an LED emitting white light, for example, the white light has a wavelength in a range from 400 nm to 700 nm.

In addition, the LED 60 can be electrically connected to a controller (not shown), and the controller may control the LED 60 to emit light only when the fingerprint sensor 50 is turned on, thereby saving energy.

Second Embodiment

Figure 3:
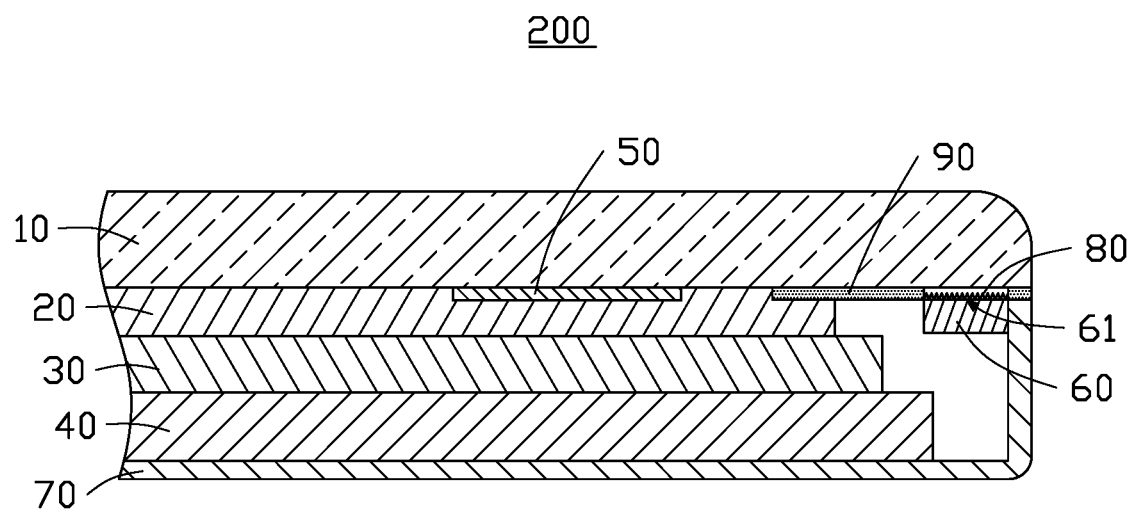
FIG. 3 is a cross-sectional view of an LCD device in accordance with a second embodiment.

Referring to FIG. 3, an LCD device 200 of the second embodiment is substantially the same as the LCD device 100 of the first embodiment, and includes a transparent cover 10, a color filter substrate 20, a liquid crystal layer (not shown), a TFT substrate 30, and a backlight module 40 stacked in that order, a fingerprint sensor 50 in the display area 101 to define a fingerprint sensing area 103, and an LED 60 on a side of the transparent cover 10 adjacent to the backlight module 40. The LED 60 is misaligned with the fingerprint sensing area 103 along a normal direction of the LCD device 200.

Differences between the LCD devices 100 and 200 are that the fingerprint sensor 50 of the LCD device 200 is positioned between the transparent cover 10 and the color filter substrate 20, while the fingerprint sensor 50 of the LCD device 100 is positioned on a side of the TFT substrate 30 adjacent to the transparent cover 10.

Third Embodiment

Figure 4:
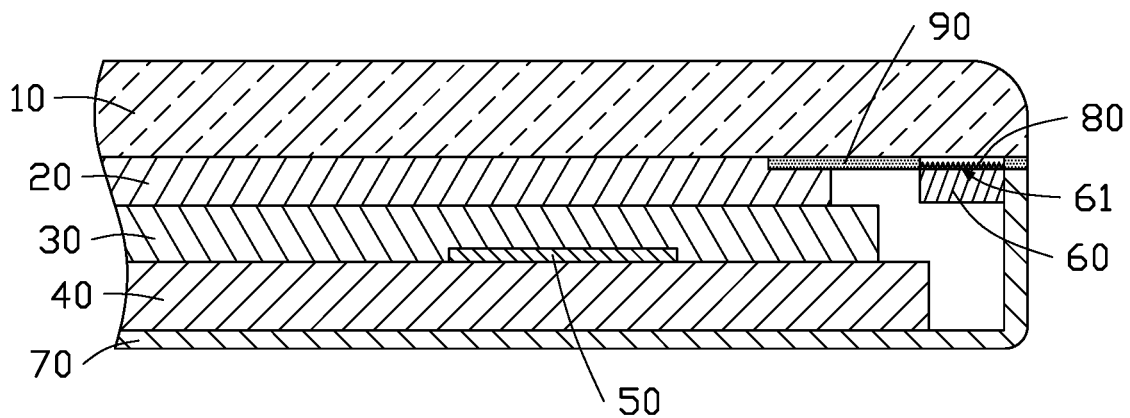
FIG. 4 is a cross-sectional view of the LCD device in accordance with a third embodiment.

Referring to FIG. 4, an LCD device 300 of the third embodiment is substantially the same as the LCD device 100 of the first embodiment, and includes a transparent cover 10, a color filter substrate 20, a liquid crystal layer (not shown), a TFT substrate 30, and a backlight module 40, a fingerprint sensor 50 in the display area 101 to define a fingerprint sensing area 103, and an LED 60 on a side of the transparent cover 10 adjacent to the backlight module 40. The LED 60 is misaligned with the fingerprint sensing area 103 along a normal direction of the LCD device 300.

Differences between the LCD devices 100 and 300 are that the fingerprint sensor 50 of the LCD device 300 is positioned between the TFT substrate 30 and the backlight module 40, while the fingerprint sensor 50 of the LCD device 100 is positioned on a side of the TFT substrate 30 adjacent to the transparent cover 10.

Fourth Embodiment

Figure 5:
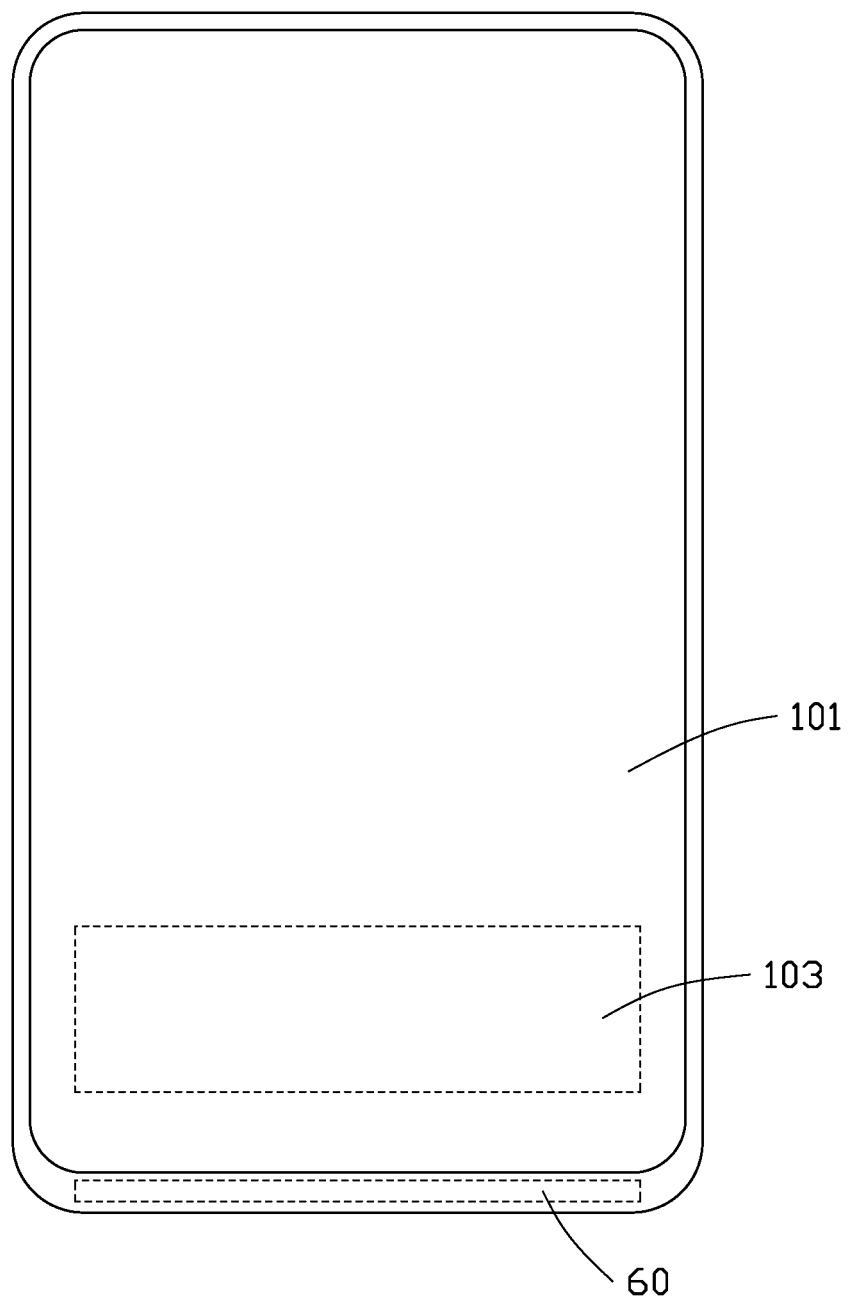
FIG. 5 is a bottom view of an LCD device in accordance with a fourth embodiment.

An LCD device 400 of the fourth embodiment is substantially the same as the LCD device 100 of the first embodiment, and includes a transparent cover (not shown), a color filter substrate (not shown), a liquid crystal layer (not shown), a TFT substrate (not shown), and a backlight module (not shown), a fingerprint sensor (not shown) in the display area 101 to define a fingerprint sensing area 103, and at least one LED 60 is misaligned with the fingerprint sensing area 103 along a normal direction of the LCD device 400, as shown in FIG. 5.

Differences between the LCD devices 100 and 400 are that a size of the fingerprint sensing area 103 of the LCD device 400 is greater than a size of the fingerprint sensing area 103 of the LCD device 100. The fingerprint sensor of the LCD device 400 has a larger size to define the fingerprint sensing area 103 having a greater size. In this embodiment, the at least one LED 60 may be at least two LEDs arranged in one row.

Fifth Embodiment

Figure 6:
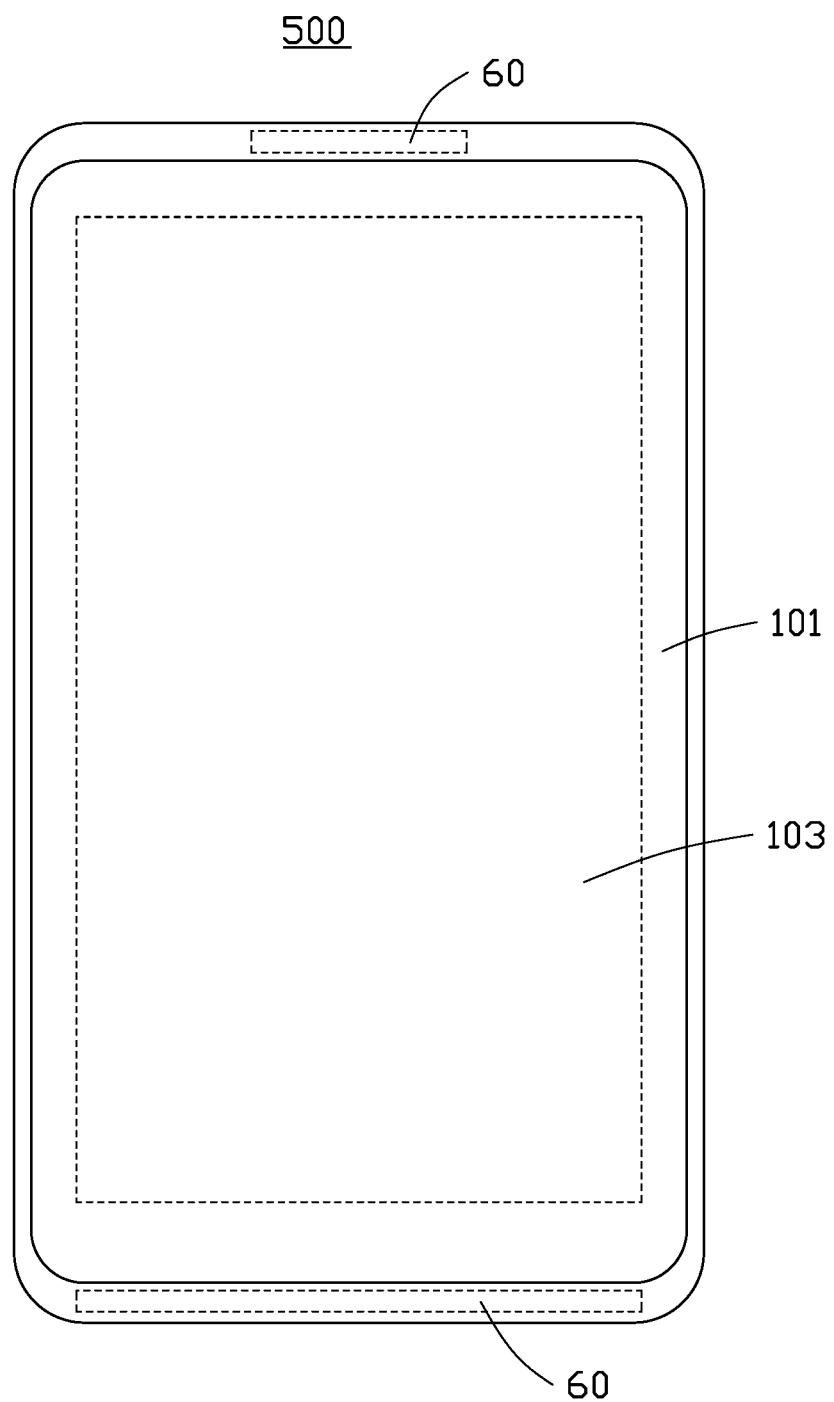
FIG. 6 is a bottom view of an LCD device in accordance with a fifth embodiment.
Figure 7:
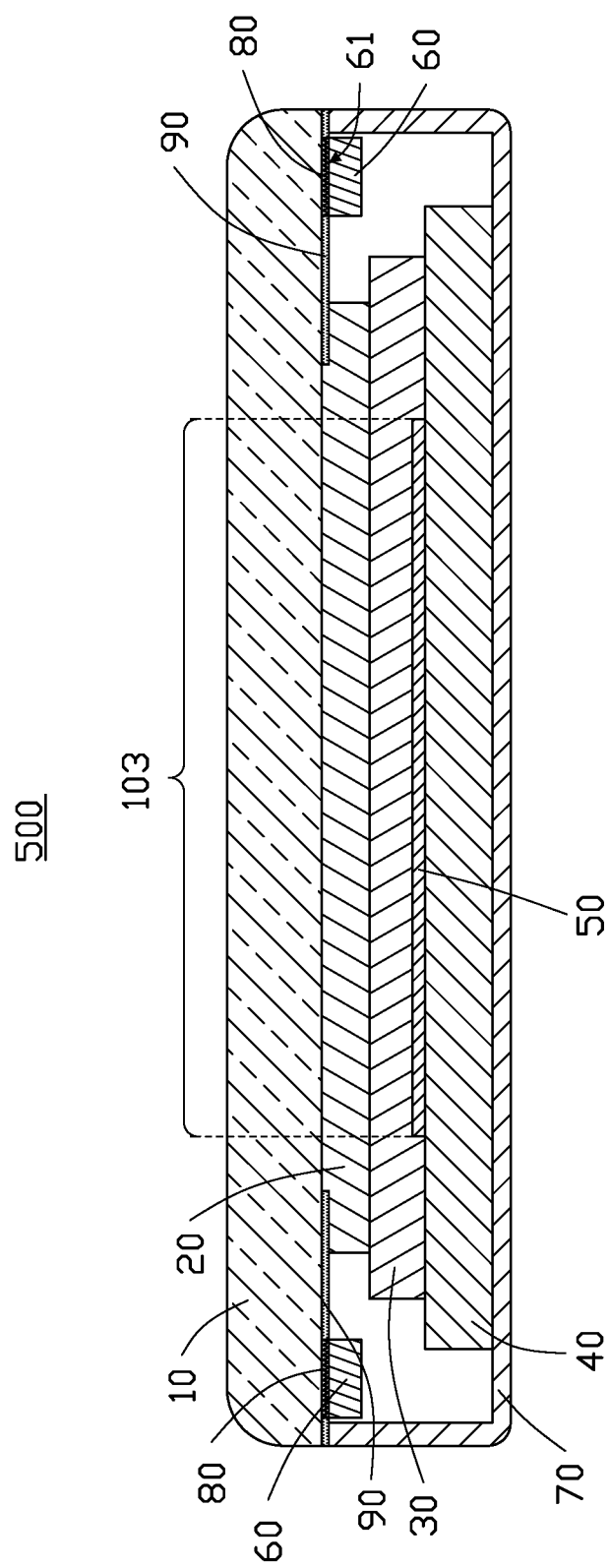
FIG. 7 is a cross-sectional view of the LCD device in accordance with the fifth embodiment.

Referring to FIG. 6 and FIG. 7, an LCD device 500 of the fifth embodiment is substantially the same as the LCD device 100 of the first embodiment, and includes a transparent cover 10, a color filter substrate 20, a liquid crystal layer (not shown), a TFT substrate 30, and a backlight module 40, a fingerprint sensor 50 in the display area 101 to define a fingerprint sensing area 103, and at least one LED 60 on a side of the transparent cover 10 adjacent to the backlight module 40 and misaligning with the fingerprint sensing area 103 along a normal direction of the LCD device 500. In this embodiment, the fingerprint sensing area 103 has a greater size, and basically occupies most of the display area 101, and the fingerprint sensor 50 also has a greater size.

In this embodiment, the fingerprint sensor 50 is positioned on the TFT substrate 30, and is particularly positioned on a side of the TFT substrate 30 adjacent to the color filter substrate 20. It can be understood that the position of the fingerprint sensor 50 can also be adjusted according to the second and third embodiments.

As shown in FIG. 6, the at least one LED 60 can be divided into two groups. The two groups of LEDs 60 are positioned outside the display area 101 and on opposite sides of the display area 101. One group of LEDs 60 is positioned near a lower edge of the display device 100; the other group of LEDs 60 is positioned near an upper edge of the display device 100. Both groups of LEDs 60 are spaced apart from the fingerprint sensing area 103. Each group of LEDs 60 includes at least one LED 60.

As shown in FIG. 7, a light adjusting component 80 is positioned between the light-emitting surface 61 of each group of LEDs 60 and the transparent cover 10. The light adjusting component 80 changes a propagation path of the light emitted from the LED 60, so that most light from the LED 60 can be emitted toward the fingerprint sensing area 103 on the transparent cover 10. A light-shielding material layer 90 is further provided on a surface of the transparent cover 10 adjacent to the LED 60 and surrounds the light-emitting surface 61 of the LED 60.

The two groups of LEDs 60 can be electrically connected to a controller (not shown), and the controller may independently control the two groups of LEDs 60 to emit light. It can be selected which group of LEDs 60 is turned on according to a position of the finger pressing in the fingerprint sensing area 103, thereby saving energy.

Figure 8A:
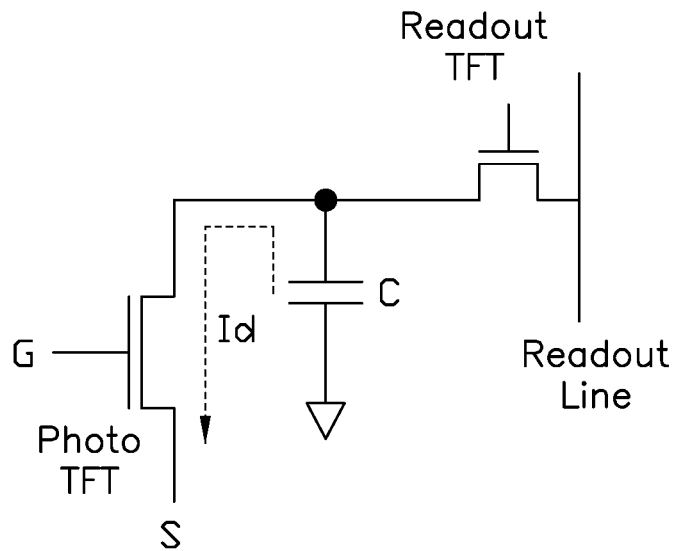
FIG. 8A and FIG. 8B are views showing two circuits of a fingerprint sensor in the LCD device.
Figure 8B:
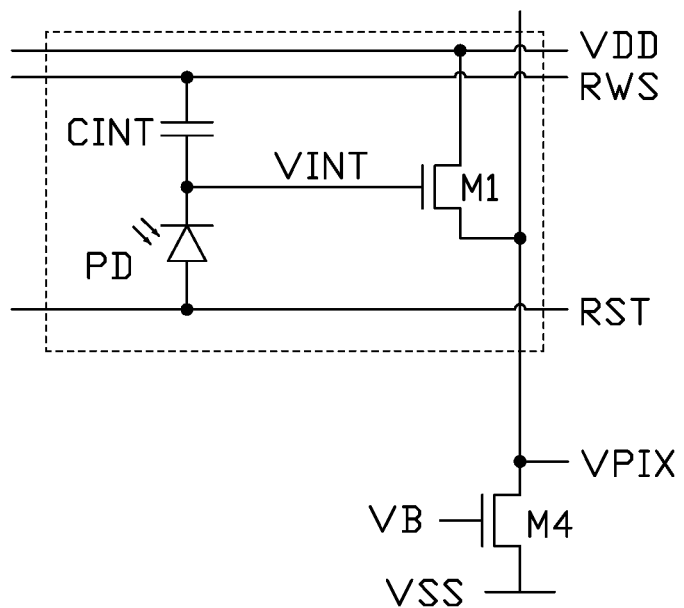

The fingerprint sensor 50 in each of the above embodiments can be a conventional optical fingerprint sensor. The fingerprint sensor 50 may include PIN diodes or a sensing circuit including a TFT in a pixel region. FIG. 8 shows two circuits of the fingerprint sensor 50.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A liquid crystal display (LCD) device defining a display area, comprising:
   a color filter substrate;
   a thin film transistor (TFT) substrate facing the color filter substrate;
   a backlight module on a side of the TFT substrate away from the color filter substrate;
   a transparent cover on a side of the color filter substrate away from the TFT substrate; and
   a fingerprint sensor in the display area, the fingerprint senor defining a fingerprint sensing area of the LCD device, the fingerprint sensing area being in the display area;
   wherein the LCD device further comprises at least one light emitting diode on a side of the transparent cover adjacent to the color filter substrate; the light emitting diode is configured to emit light toward the fingerprint sensing area on the transparent cover;
   wherein each of the at least one light emitting diode is not positioned in the display area; a light adjusting component is positioned between each of the light emitting diode and the transparent cover; the light adjusting component is configured to change a propagation path of light emitted from the light emitting diode toward the fingerprint sensing area on the transparent cover.

2. The LCD device of claim 1, wherein the light adjusting component is a microprisms, a microlens, a polymer mirror, or a holographic mirror.

3. The LCD device of claim 1, wherein each of the at least one light emitting diode has a light-emitting surface perpendicular to a normal direction of the LCD device.

4. The LCD device of claim 1, wherein the at least one light emitting diode comprises two groups of light emitting diodes, the two groups of light emitting diodes are positioned on opposite sides of the display area.

5. The LCD device of claim 1, wherein the color filter substrate partially covers the transparent cover.

6. The LCD device of claim 5, wherein the at least one light emitting diode is positioned in a region of the transparent cover that is not covered by the color filter substrate.

7. The LCD device of claim 1, further comprising a light-shielding material layer on a surface of the transparent cover adjacent to the light emitting diode, the light-shielding material layer surrounds each of the at least one light emitting diode.

8. The LCD device of claim 1, wherein the fingerprint sensor is positioned on the TFT substrate, and on a side of the TFT substrate adjacent to the color filter substrate.

9. The LCD device of claim 1, wherein the fingerprint sensor is positioned between the transparent cover and the color filter substrate.

10. The LCD device of claim 1, wherein the fingerprint sensor is positioned between the TFT substrate and the backlight module.

11. The LCD device of claim 1, wherein the at least one light emitting diode comprise a plurality of light emitting diodes arranged in one row.

* * * * *